(12) United States Patent
Chen

(10) Patent No.: US 10,394,093 B2
(45) Date of Patent: Aug. 27, 2019

(54) ARRAY SUBSTRATE, MANUFACTURING METHOD THEREOF, AND APPLIED DISPLAY PANEL THEREOF

(71) Applicants: HKC Corporation Limited, Shenzhen, Guangdong (CN); Chongqing HKC Optoelectronics Technology Co., Ltd., Chongqing (CN)

(72) Inventor: Yu-Jen Chen, Chongqing (CN)

(73) Assignees: HKC CORPORATION LIMITED, Shenzhen, Guangdong (CN); CHONGQING HKC OPTOELECTRONICS TECHNOLOGY CO., LTD., Chongqing (CN)

( * ) Notice: Subject to any disclaimer, the term of this patent is extended or adjusted under 35 U.S.C. 154(b) by 0 days.

(21) Appl. No.: 15/561,663

(22) PCT Filed: Aug. 17, 2017

(86) PCT No.: PCT/CN2017/097878
§ 371 (c)(1),
(2) Date: Sep. 26, 2017

(87) PCT Pub. No.: WO2019/006827
PCT Pub. Date: Jan. 10, 2019

(65) Prior Publication Data
US 2019/0011753 A1   Jan. 10, 2019

(30) Foreign Application Priority Data
Jul. 7, 2017   (CN) .......................... 2017 1 0552751

(51) Int. Cl.
*G02F 1/1333* (2006.01)
*G02F 1/1343* (2006.01)
(Continued)

(52) U.S. Cl.
CPC .... *G02F 1/13439* (2013.01); *G02F 1/133345* (2013.01); *G02F 1/134363* (2013.01); *G02F 1/1368* (2013.01); *G02F 2001/136236* (2013.01)

(58) Field of Classification Search
CPC .......... G02F 1/13439; G02F 1/133345; G02F 1/134363; G02F 1/1368; G02F 2001/136236; G02F 2001/134372
See application file for complete search history.

(56) References Cited

U.S. PATENT DOCUMENTS

| 2014/0022478 | A1  | 1/2014 | Kim et al. |
| 2014/0176895 | A1* | 6/2014 | Park ...................... G02F 1/1339 349/153 |
| 2016/0103374 | A1* | 4/2016 | Tanaka .............. G02F 1/133345 349/43 |

FOREIGN PATENT DOCUMENTS

| CN | 101900913 A | 12/2010 |
| CN | 103151359 A | 6/2013 |

(Continued)

*Primary Examiner* — Nathanael R Briggs
(74) *Attorney, Agent, or Firm* — Muncy, Geissler, Olds & Lowe, P.C.

(57) ABSTRACT

The present invention relates to an array substrate, a manufacturing method thereof, and an applied display panel thereof. The array substrate comprises: a first substrate; a first conductive layer formed on the first substrate; a conductive cover layer formed on the first substrate and covering the first conductive layer; a second conductive layer formed on the conductive cover layer; a first passivation layer formed on the conductive cover layer and covering the second conductive layer, wherein at least one recession part is formed in the first passivation layer; a common electrode formed on the passivation layer, wherein a part of the common electrode is formed inside the recession part; a second passivation layer formed on the common electrode;

(Continued)

and a pixel electrode layer formed on the second passivation layer and inside the recession part.

20 Claims, 14 Drawing Sheets

(51) Int. Cl.
*G02F 1/1362* (2006.01)
*G02F 1/1368* (2006.01)

(56) References Cited

FOREIGN PATENT DOCUMENTS

| CN | 103488003 A | 1/2014 |
|----|-------------|--------|
| CN | 104049418 A | 9/2014 |
| CN | 104880882 A | 9/2015 |
| CN | 106024808 A | 10/2016 |

* cited by examiner

ARRAY SUBSTRATE, MANUFACTURING METHOD THEREOF, AND APPLIED DISPLAY PANEL THEREOF

BACKGROUND OF THE INVENTION

Field of Invention

The present invention generally relates to a method of manufacturing an array substrate, and especially to an array substrate, a manufacturing method thereof, and an applied display panel thereof.

Description of Related Art

In recent years, with the development of science and technology, a liquid crystal display (LCD) is getting popular with a variety of advantages, such as power saving, no radiation, small size, low power consumption, flat right angle, high resolution, high image quality and display stability. A demand for the liquid crystal display (LCD) is further improved greatly, since the liquid crystal display (LCD) is widely used in information or communication products in the markets, such as mobile phones, laptops, digital cameras, a personal digital assistant (PDA), LCD screens, a handheld PC, etc. A liquid crystal display (LCD) is usually composed of a color filter (CF) substrate, an array substrate (ex: a thin film transistor (TFT) array substrate) and a liquid crystal layer formed between the color filter (CF) substrate and the array substrate. The working or operation principle of the liquid crystal display (LCD) is: liquid crystals in the liquid crystal layer are rotated and controlled by a driving electric field applied on the color filter (CF) substrate and the array substrate, and then a light is reflected from a back light module, so that an image can be shown. According to the orientation of the liquid crystals, a current market has many different types for the liquid crystal display (LCD), such as: a vertical alignment (VA) type liquid crystal display (LCD), a twisted nematic (TN) type liquid crystal display (LCD), a super twisted nematic (STN) type liquid crystal display (LCD), an in-plane switching (IPS) type liquid crystal display (LCD), a fringe field switching (FFS) type liquid crystal display (LCD), etc. Therefore, it is more and more important to improve a thin film transistor liquid crystal display (TFT-LCD) with superiority of high quality, good space utilization efficiency, low power consumption, no radiation, etc. It is especially to for an important component, the array substrate, of thin film transistor liquid crystal display (TFT-LCD).

The array substrate includes an array substrate having an RGB photoresist layer on a color filter (CF) substrate (RGB on CF type), an array substrate with an RGB photoresist layer for an in-plane switching (IPS) display panel (RGB on Array type/IPS mode), and an array substrate with an RGB photoresist layer for a vertical alignment display panel (RGB on Array type/VA mode). As the above mentioned, a pixel design of an array substrate is a key factor for improving pixel resolution. For example, a fringe field switching (FFS) type liquid crystal display (LCD) uses a fringe electric field to push liquid crystals to provide advantages of high liquid crystal efficiency and wide viewing angle. A liquid crystal display (LCD) is generally designed to have two indium tin oxide electrode layers, and a protecting layer with a thickness of 0.6 μm is formed between the two indium tin oxide electrode layers. In a big pixel design, a membrane permeability of an array substrate is almost the same and does not change very much. However, in a small and high resolution pixel design, especially in a smaller than 100 μm pixel design, it is a very important factor to improve the membrane permeability of a transparent area of the array substrate.

SUMMARY OF THE INVENTION

For resolving the technical problems above-mentioned, the objects of the present invention are to provide an array substrate, a manufacturing method thereof, and an applied display panel thereof. The present invention can improve liquid crystal efficiency and increase a penetration rate of a pixel, so that an image quality is improved.

The objects and technical solutions of the present invention are implemented by following technical ways and means. In one perspective, the present array substrate comprises: a first substrate; a first conductive layer formed on the first substrate; a conductive cover layer formed on the first substrate and covering the first conductive layer; a second conductive layer formed on the conductive cover layer; a first passivation layer formed on the conductive cover layer and covering the second conductive layer, wherein at least one recession part is formed in the first passivation layer; a common electrode formed on the passivation layer, wherein a part of the common electrode is formed inside the recession part; a second passivation layer formed on the common electrode; and a pixel electrode layer formed on the second passivation layer and inside the recession part.

In another perspective, the present method of manufacturing an array substrate comprises: providing a first substrate; forming a first conductive layer on the first substrate; forming a conductive cover layer on the first substrate and covering the first conductive layer; forming a second conductive layer on the conductive cover layer; forming a first passivation layer on the conductive cover layer and covering the second conductive layer, wherein at least one recession part is formed in the first passivation layer; forming a common electrode on the first passivation layer, wherein apart of the common electrode is formed inside the recession part; forming a second passivation layer on the common electrode; and forming a pixel electrode layer on the second passivation layer and inside the recession part.

In another perspective, the present display panel has an array substrate. The array substrate comprises: a first substrate; a first conductive layer formed on the first substrate; a conductive cover layer formed on the first substrate and covering the first conductive layer; a second conductive layer formed on the conductive cover layer; a first passivation layer formed on the conductive cover layer and covering the second conductive layer, wherein at least one recession part is formed in the first passivation layer; a common electrode formed on the passivation layer, wherein a part of the common electrode is formed inside the recession part; a second passivation layer formed on the common electrode; and a pixel electrode layer formed on the second passivation layer and inside the recession part.

The objects and technical solutions of the present invention can be further implemented by following technical ways and means.

In one embodiment of the present invention, the common electrode is an indium tin oxide and the pixel electrode layer is an indium tin oxide.

In one embodiment of the present invention, the first passivation layer uses a photomask and the second passivation layer uses a photomask.

In one embodiment of the present invention, the array substrate has a recession shape or an arc shape in cross-sectional view.

In one embodiment of the present invention, an electrode capability optimization process is performed on a fringe indium tin oxide electrode located in a removed area, wherein the removed area for locating the fringe indium tin oxide electrode is at a transparent area corresponding to the first passivation layer and the common electrode, and at a transparent area corresponding to the conductive cover layer and the common electrode.

In one embodiment of the present invention, the present manufacturing method further comprises: the first passivation layer and the second passivation layer having a stepped surface in cross-sectional view; the first passivation layer and the second passivation layer being simultaneously formed by performing a photoresist coating process, an exposure process, a development process, and a mask process; and the mask including a gray scale mask or a half tone mask.

In one embodiment of the present invention, the second conductive layer is simultaneously formed on the conductive cover layer by performing a photoresist coating process, an exposure process, a development process, a mask process and an etching process.

The first passivation layer and the conductive cover layer are removed by an etching process, wherein a tapered angle or an inclined angle on a fringe area thereof is smaller than 90 degrees.

In one embodiment of the present invention, the common electrode is an indium tin oxide.

In one embodiment of the present invention, in the display panel, the pixel electrode layer is an indium tin oxide.

In one embodiment of the present invention, the first passivation layer uses a photomask in the display panel.

In one embodiment of the present invention, the second passivation layer uses a photomask.

In one embodiment of the present invention, in the display panel, the array substrate has an arc shape or a recession shape in cross-sectional view.

By the foregoing array substrate design, the present invention can improve liquid crystal efficiency and increase a penetration rate of a pixel, so that an image quality is improved.

DESCRIPTION OF THE PREFERRED EMBODIMENTS

Figure 1A:
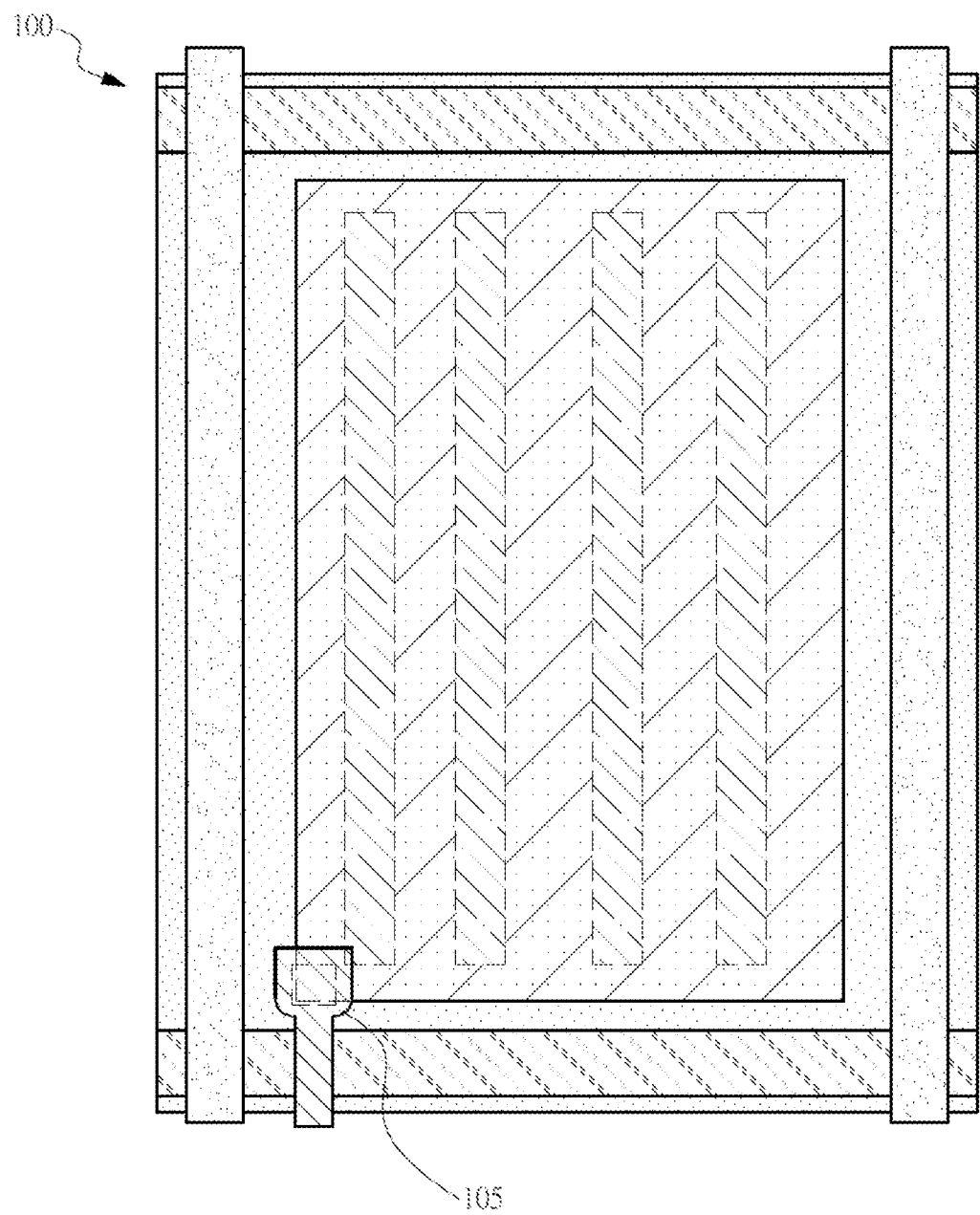
FIG. 1a shows a top view illustrating an example pixel structure of a fringe field switching type liquid crystal display (LCD) panel.

The drawings as referred to throughout the description of the present invention are examples for implementing the objects of the present invention. The orientation words or terms used in the description of the present invention, such as "above", "under", "forward", "backward", "left", "right", "inner", "outer", "side", etc. are examples in the drawings for illustrative purpose only, or just show the interrelations between the components, but not to be construed as limitations to the scope of the present invention.

The drawings and the description of the present invention are deemed to be examples but not limitations essentially. In the drawings, components or elements having similar or same structure are marked with the same numbers. In addition, sizes and thicknesses of every component or element are just examples, but not drawn according to actual scale and not read as limitations to the scope of the present invention.

In drawings of the present invention, sizes and thicknesses of layers, films, panels, or regions are emphasized for clearness, easy to describe and easy to understand. Therefore, some layers, films, or regions are emphasized but not drawn according to their actual scales. It is to be understood that, for example, when one of the components of layers, films, regions, or substrate are "on" another component of layers, films, regions, or substrate, the one of the components of layers, films, regions, or substrate could be adjacent on another component of layers, films, regions, or substrate directly, or there could be other inter-components of layers, films, regions, or substrate formed therebetween.

Furthermore, in the description of the present invention, a word "comprising" or "including" is construed to comprise or include the related components, but not exclude other components, except there is clearly opposite word or description in the present invention. And, in the description of the present invention, a word "on" can be construed to be above or under a target component, but not only construed to be on a top of the target component in vertical or gravity direction.

For further clarifying the technical solutions or functions of the present invention to implement the objects of the present invention, an array substrate, a manufacturing method thereof, and an applied display panel thereof, and their specific implementations, structures, features and functions, according to a preferred embodiment of the present invention will be apparent from the following detailed description with reference to the accompanying drawings.

The present display panel can include a thin film transistor (TFT) substrate, a color filter (CF) substrate, and a liquid crystal layer formed between the thin film transistor (TFT) substrate and the color filter (CF) substrate.

In one embodiment of the present invention, a display panel can be a curved display panel.

In one embodiment of the present invention, the thin film transistor (TFT) substrate and the color filter (CF) substrate can be formed on the same substrate.

Figure 1B:
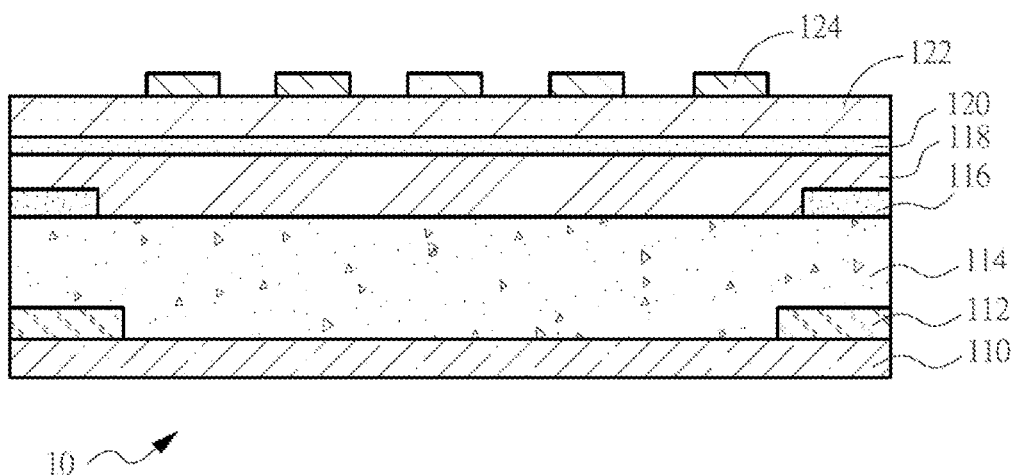
FIG. 1b shows a cross-sectional view illustrating an example array substrate structure of a fringe field switching type liquid crystal display (LCD) panel.

FIG. 1a shows a top view illustrating an example fringe field switching pixel structure. FIG. 1b shows a cross-sectional view illustrating an example fringe field switching pixel structure in an array substrate. Please refer to FIGS. 1a and 1b, an array substrate 10 comprises: a first substrate 110; a first conductive layer 112 formed on the first substrate 110; a conductive cover layer 114 formed on the first substrate 110 and covers the first conductive layer 112; a second conductive layer 116 formed on the conductive cover layer 114, wherein the second conductive layer 116 and the first conductive layer 112 define a plurality of pixel areas; a first passivation layer 118 formed on the conductive cover layer 114 and covers the second conductive layer 116; a plurality of strips of common electrode 120 formed on the first passivation layer 118; a second passivation layer 122 formed on the common electrode 120; and a pixel electrode layer 124 formed on the second passivation layer 122.

Please refer to FIG. 1a, in one embodiment of the present invention, an example fringe field switching pixel structure 100 is generally designed to have two indium tin oxide electrode layers, and a protecting layer 105 with a thickness of 0.6 μm is formed between the two indium tin oxide electrode layers.

Figure 2A:
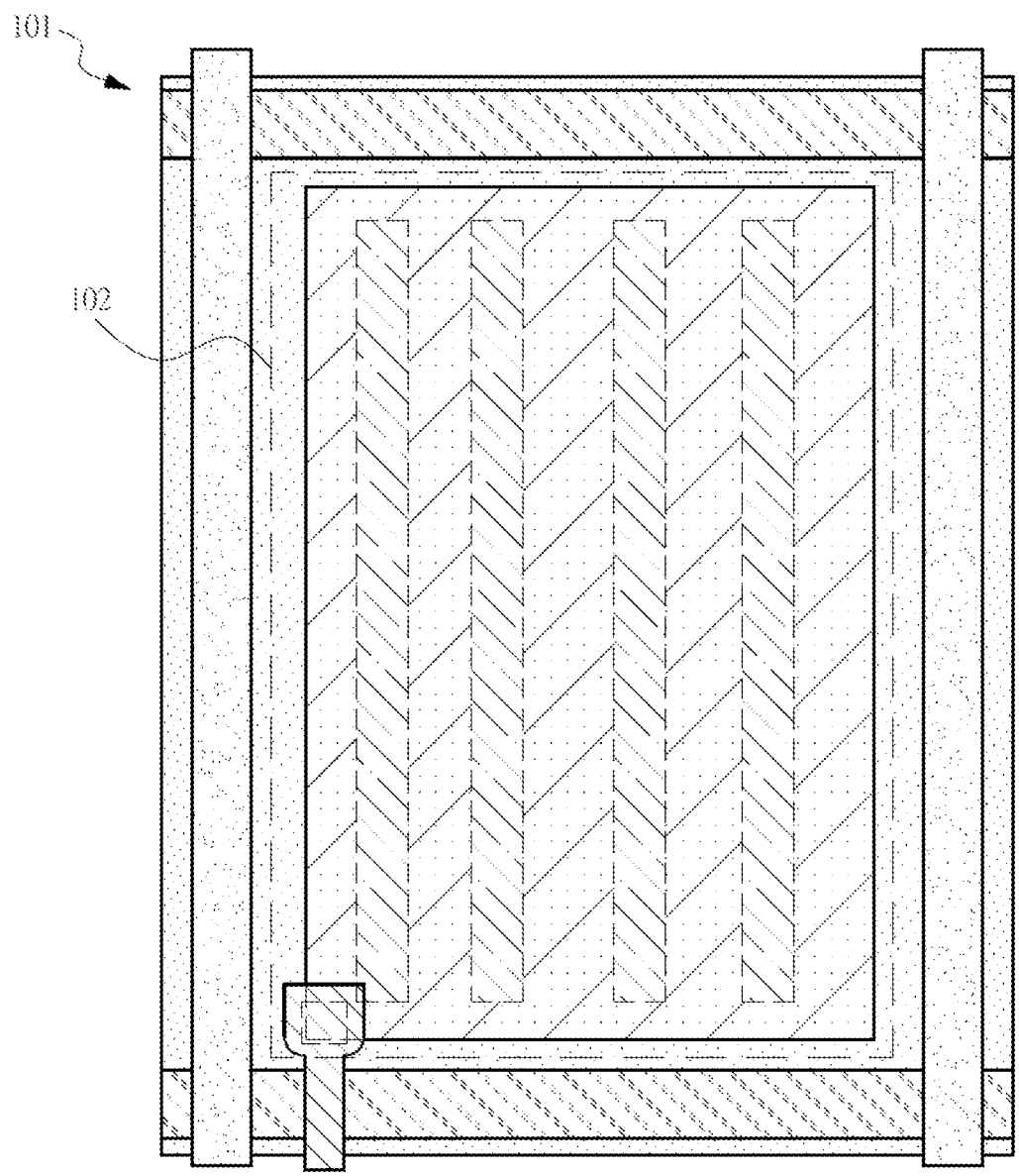
FIG. 2a shows a top view illustrating a pixel structure with a first passivation layer and a removed conductive cover layer for a fringe field switching type liquid crystal display (LCD) panel according to one embodiment of the present invention.
Figure 2B:
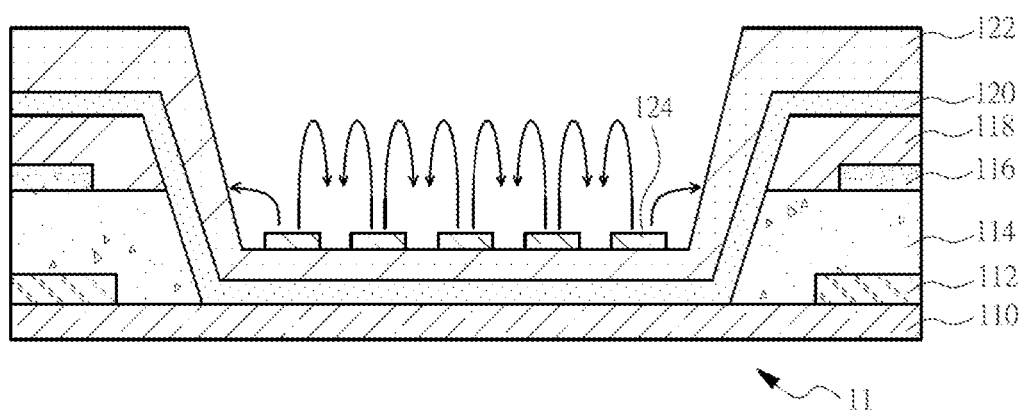
FIG. 2b shows a cross-sectional view illustrating an array substrate structure of a fringe field switching type liquid crystal display (LCD) panel according to one embodiment of the present invention.

FIG. 2a shows a top view illustrating a pixel structure with a first passivation layer and a partly removed conductive cover layer for a fringe field switching type liquid crystal display (LCD) panel according to one embodiment of the present invention. FIG. 2b shows a cross-sectional view illustrating an array substrate structure of a fringe field switching type liquid crystal display (LCD) panel according to one embodiment of the present invention. Please refer to FIGS. 2a and 2b, an array substrate 11 comprises: a first substrate 110; a first conductive layer 112 formed on the first substrate 110; a conductive cover layer 114 formed on the first substrate 110 and covers the first conductive layer 112; a second conductive layer 116 formed on the conductive cover layer 114; a first passivation layer 118 formed on the conductive cover layer 114 and covers the second conductive layer 116, wherein a recession part is formed within the first passivation layer 118; a common electrode 120 formed on the first passivation layer 118, wherein a part of the common electrode 120 is formed inside the recession part; a second passivation layer 122 formed on the common electrode 120; and a pixel electrode layer 124 formed on the second passivation layer 122 and inside the recession part.

Please refer to FIG. 2a, in one embodiment of the present invention, a fringe field switching pixel structure 101 includes a removed area 102 formed by partly removing the first passivation layer 118 and the conductive cover layer 114.

In one embodiment of the present invention, the common electrode 120 is an indium tin oxide.

In one embodiment of the present invention, the pixel electrode layer 124 is an indium tin oxide.

In one embodiment of the present invention, the first passivation layer 118 is a photomask.

In one embodiment of the present invention, the second passivation layer 122 is a photomask.

In one embodiment of the present invention, an electrode capability optimization process is performed on a fringe indium tin oxide electrode located in a removed area, wherein the removed area for locating the fringe indium tin oxide electrode is at a transparent area corresponding to the first passivation layer 118 and the common electrode 120, and at a transparent area corresponding to the conductive cover layer 114 and the common electrode 120.

Figure 3A:
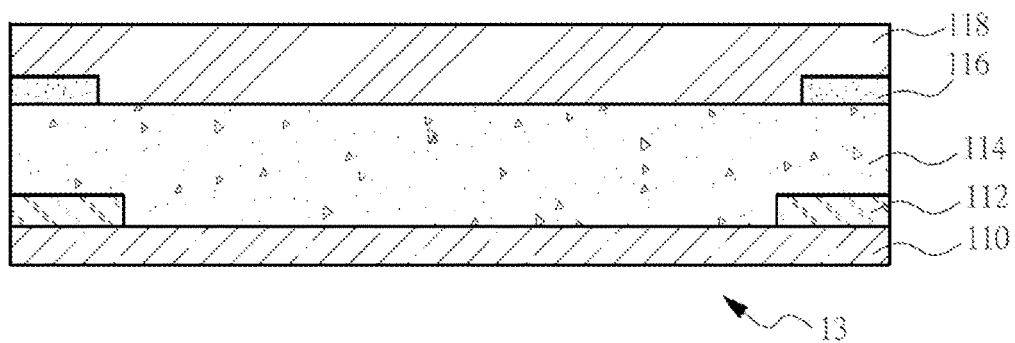
FIG. 3a shows a cross-sectional view illustrating a manufacturing method of an array substrate structure of a fringe field switching type liquid crystal display (LCD) panel according to one embodiment of the present invention.
Figure 3B:
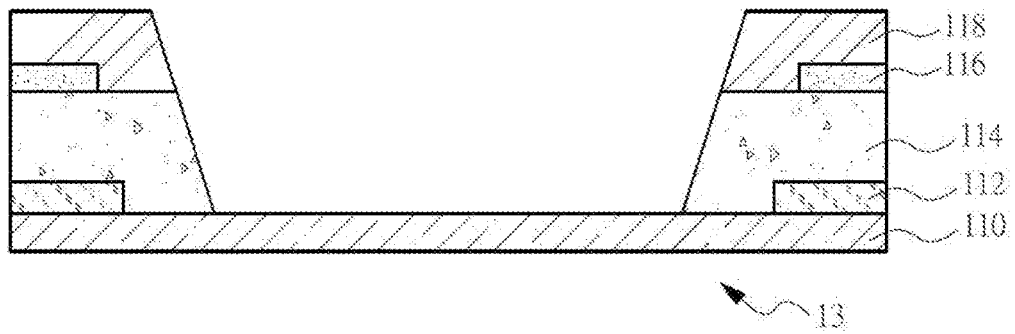
FIG. 3b shows a cross-sectional view illustrating a manufacturing method of an array substrate structure of a fringe field switching type liquid crystal display (LCD) panel according to one embodiment of the present invention.
Figure 3C:
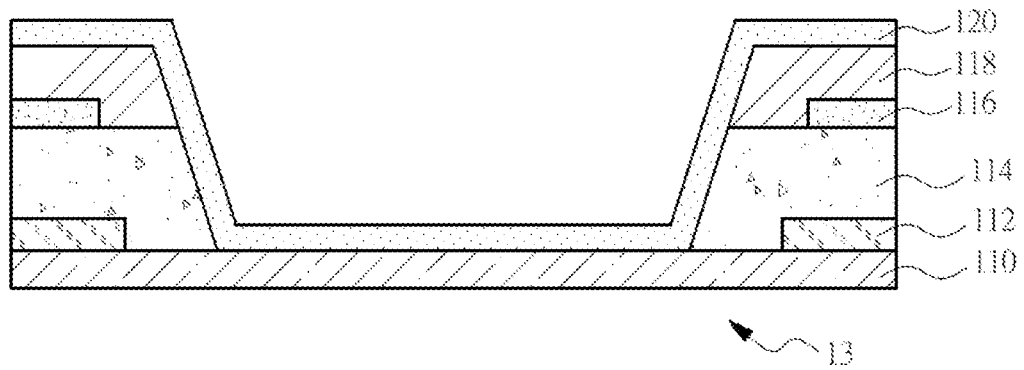
FIG. 3c shows a cross-sectional view illustrating a manufacturing method of an array substrate structure of a fringe field switching type liquid crystal display (LCD) panel according to one embodiment of the present invention.
Figure 3D:
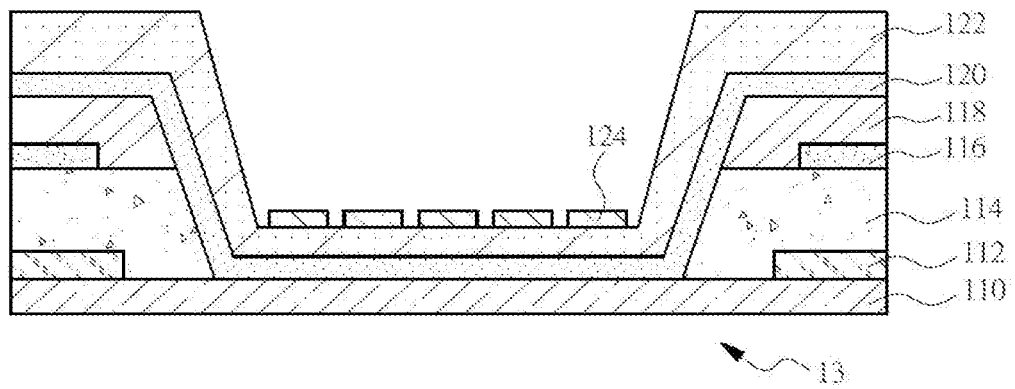
FIG. 3d shows a cross-sectional view illustrating a manufacturing method of an array substrate structure of a fringe field switching type liquid crystal display (LCD) panel according to one embodiment of the present invention.

FIG. 3a shows a cross-sectional view illustrating a manufacturing method of a fringe field switching array substrate structure of the present invention. FIG. 3b shows a cross-sectional view illustrating a manufacturing method of a fringe field switching array substrate structure of the present invention. FIG. 3c shows a cross-sectional view illustrating a manufacturing method of a fringe field switching array substrate structure of the present invention. FIG. 3d shows a cross-sectional view illustrating a manufacturing method of a fringe field switching array substrate structure of the present invention. Please refer to FIGS. 3a, 3b, 3c and 3d, a present method of manufacturing an array substrate 13 comprises: providing a first substrate 110; forming a first conductive layer 112 on the first substrate 110; forming a conductive cover layer 114 on the first substrate 110, wherein the conductive cover layer 114 covers the first conductive layer 112; forming a second conductive layer 116 on the conductive cover layer 114; forming a first passivation layer 118 on the conductive cover layer 114, wherein the first passivation layer 118 covers the second conductive layer 116, and at least one recession part is formed in the first passivation layer 118 (as shown in FIG. 3b); forming a common electrode 120 on the first passivation layer 118, wherein apart of the common electrode 120 is inside the recession part (as shown in FIG. 3c); forming a second passivation layer 122 on the common electrode 120 (as shown in FIG. 3d); and forming a pixel electrode layer 124 on the second passivation layer 122 and inside the recession part (as shown in FIG. 3d).

In one embodiment of the present invention, the present manufacturing method of a fringe field switching array substrate structure comprises: the first passivation layer 118 and the second passivation layer 122 having a stepped surface in cross-sectional view, wherein the first passivation layer 118 and the second passivation layer 122 are simultaneously formed by performing a photoresist coating process, an exposure process, a development process, and a mask process, wherein the mask includes a gray scale mask or a half tone mask.

In one embodiment of the present invention, the present manufacturing method of the fringe field switching array substrate structure comprises: the second conductive layer 116 simultaneously formed on the conductive cover layer 114 by performing a photoresist coating process, an exposure process, a development process, a mask process and an etching process.

In one embodiment of the present invention, the present manufacturing method of the fringe field switching array substrate structure comprises: the first passivation layer 118 and the conductive cover layer 114 removed by an etching process, wherein a tapered angle or an inclined angle on a fringe area thereof is smaller than 90 degrees.

Please refer to FIG. 2b, in one embodiment of the present invention, a display panel comprises: an array substrate 11 comprises: a first substrate 110; a first conductive layer 112 formed on the first substrate 110; a conductive cover layer 114 formed on the first substrate 110 and covers the first conductive layer 112; a second conductive layer 116 formed on the conductive cover layer 114; a first passivation layer 118 formed on the conductive cover layer 114 and covers the second conductive layer 116, wherein a recession part is formed within the first passivation layer 118; a common electrode 120 formed on the first passivation layer 118, wherein apart of the common electrode 120 is formed inside the recession part; a second passivation layer 122 formed on the common electrode 120; and a pixel electrode layer 124 formed on the second passivation layer 122 and inside the recession part. The present display panel further comprises: a color filter substrate (not shown) formed oppositely to the array substrate 11; and a liquid crystal layer (not shown) formed between the array substrate 11 and the color filter substrate, wherein the present display panels can be a twisted nematic (TN) display panel, an optically compensated bend (OCB) display panel, a vertical alignment (VA) display panel, a curved liquid crystal display panel, etc. The present display panels are not limited on above-mentioned display panels.

A multi-grayscale mask includes a gray scale mask and a half tone mask. The gray scale mask can include micro slits whose scales are smaller than a resolution of an exposure machine. The micro slits are used for masking a part of light to perform a semi-exposure process. Or, on the other hand, the gray scale mask can include a semi-permeability membrane to perform a semi-exposure process. Both of the above-mentioned two ways can perform three exposure levels of an exposure part, a semi-exposure part, and a non-exposure part, after performing an exposure process. Therefore, a photoresist layer can have at least two different thicknesses after performing a development process. By way of the photoresist layer having two different thicknesses, different patterns can be transformed on a display substrate using less photoresist layers and improving manufacturing efficiency for display panels. Usually, a half tone mask costs higher than other masks.

Figure 4:
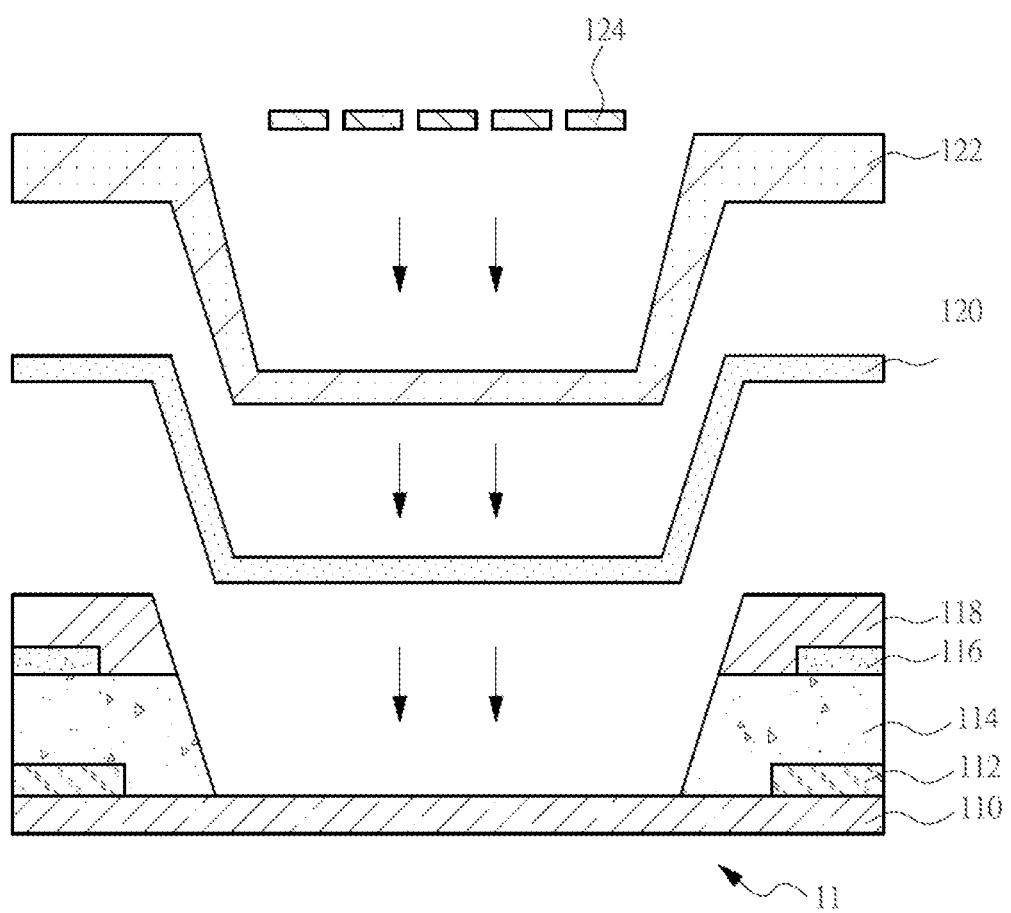
FIG. 4 shows a cross-sectional view illustrating a manufacturing method of a recession part in an array substrate structure of a fringe field switching type liquid crystal display (LCD) panel according to one embodiment of the present invention.

FIG. 4 shows a cross-sectional view illustrating a manufacturing method of a recession part in a fringe field switching array substrate according to one embodiment of the present invention. Please refer to FIG. 4, in one embodiment of the present invention, a step of forming a recession part in an array substrate 11 comprises: forming a conductive cover layer 114 on the first substrate 110, wherein the conductive cover layer 114 covers the first conductive layer 112 and forms a fringe of the recession part; forming a second conductive layer 116 on the conductive cover layer 114; forming a first passivation layer 118 on the conductive cover layer 114, wherein the first passivation layer 118 covers the second conductive layer 116, and the first passivation layer 118 forms the fringe of the recession part; forming a common electrode 120 on the first passivation layer 118, wherein a part of the common electrode 120 forms the recession part and covers a part of the first passivation layer 118, a part of the conductive cover layer 114 and a part of the first substrate 110; forming a second passivation layer 122 on the common electrode 120, wherein a part of the second passivation layer 12 forms the recession part; and forming a pixel electrode layer 124 on the second passivation layer 122 and inside the recession part.

Figure 5:
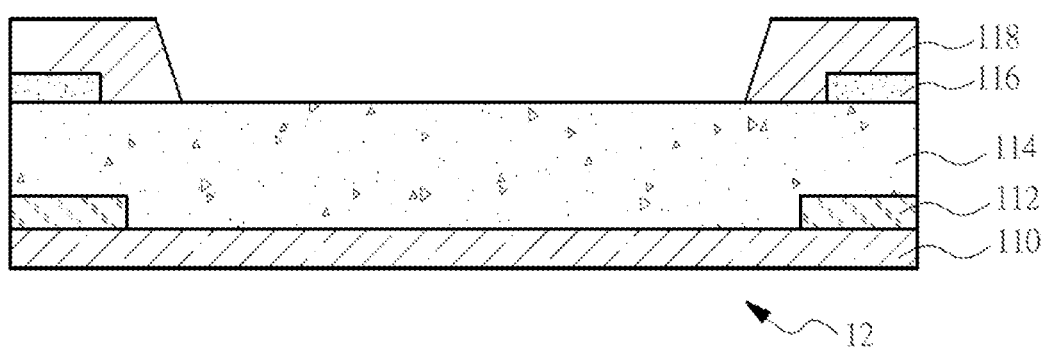
FIG. 5 shows a cross-sectional view illustrating a recession part in an array substrate structure of a fringe field switching type liquid crystal display (LCD) panel according to another embodiment of the present invention.
Figure 6:
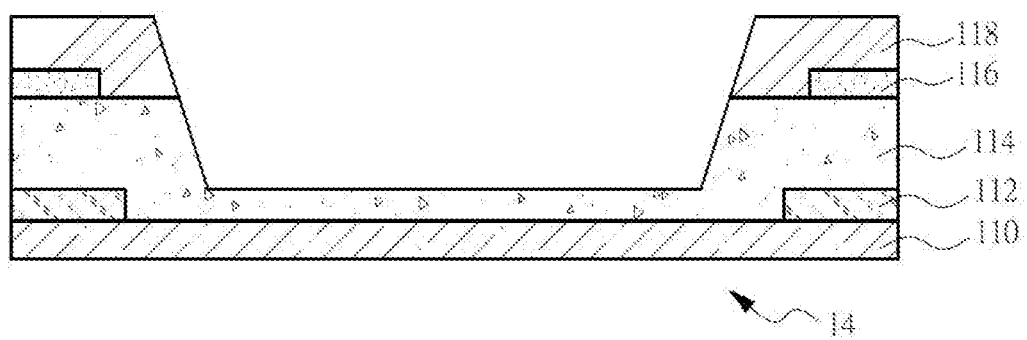
FIG. 6 shows a cross-sectional view illustrating a recession part in an array substrate structure of a fringe field switching type liquid crystal display (LCD) panel according to another embodiment of the present invention.
Figure 7:
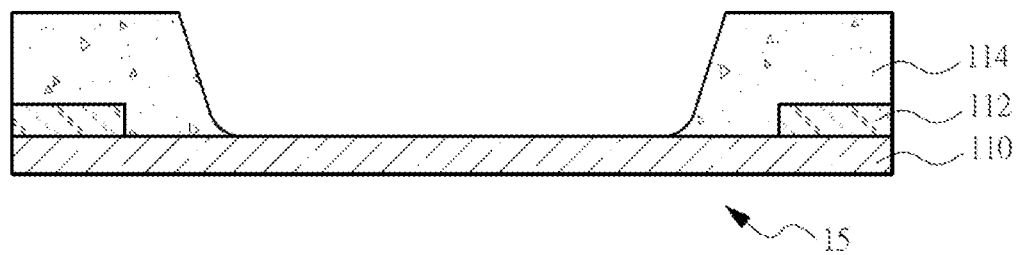
FIG. 7 shows a cross-sectional view illustrating a recession part in an array substrate structure of a fringe field switching type liquid crystal display (LCD) panel according to another embodiment of the present invention.
Figure 8:
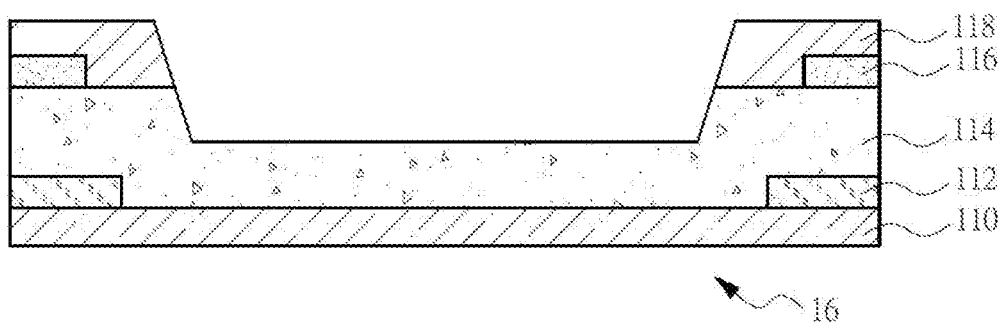
FIG. 8 shows a cross-sectional view illustrating a recession part in an array substrate structure of a fringe field switching type liquid crystal display (LCD) panel according to another embodiment of the present invention.
Figure 9:
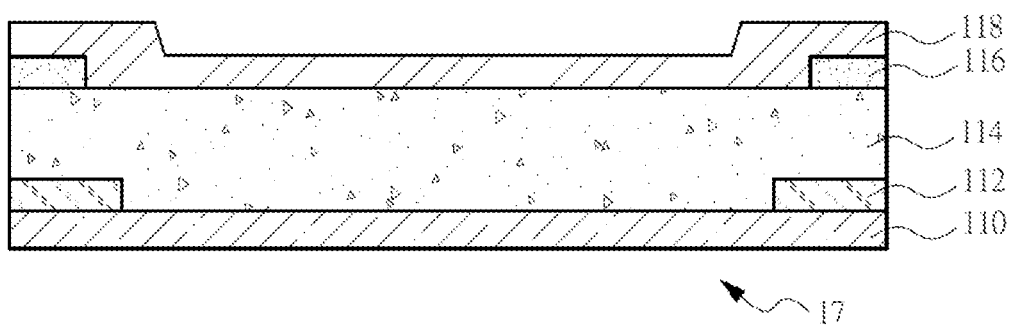
FIG. 9 shows a cross-sectional view illustrating a recession part in an array substrate structure of a fringe field switching type liquid crystal display (LCD) panel according to another embodiment of the present invention.
Figure 10:
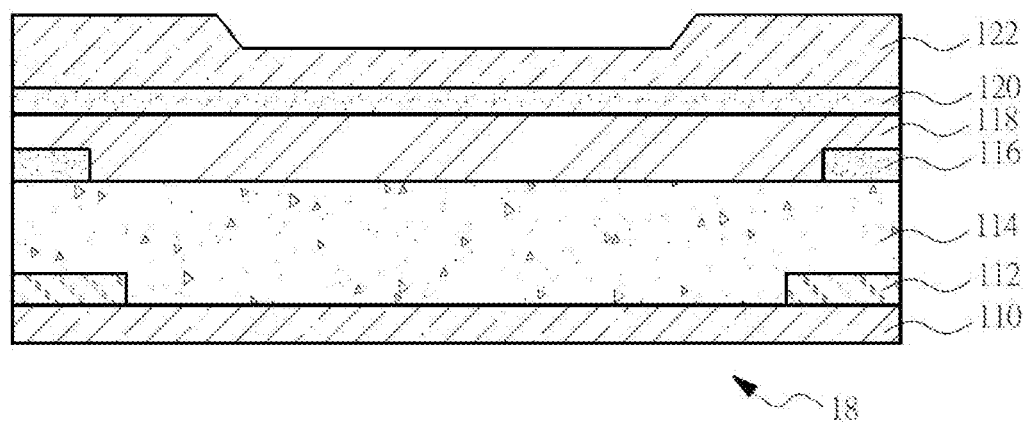
FIG. 10 shows a cross-sectional view illustrating a recession part in an array substrate structure of a fringe field switching type liquid crystal display (LCD) panel according to another embodiment of the present invention.
Figure 11:
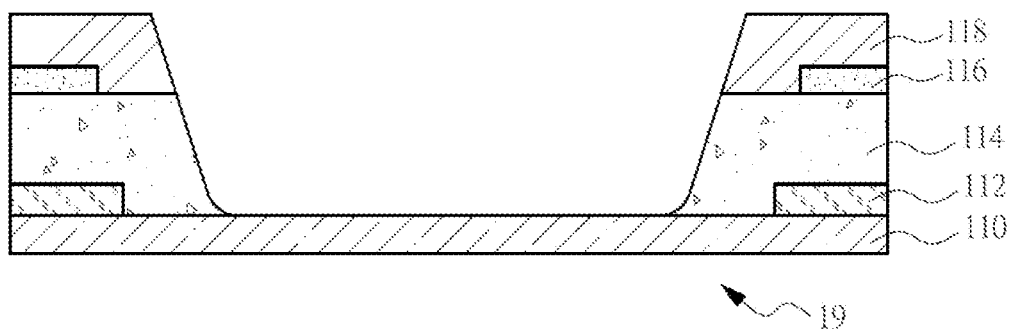
FIG. 11 shows a cross-sectional view illustrating a recession part in an array substrate structure of a fringe field switching type liquid crystal display (LCD) panel according to another embodiment of the present invention.

FIG. 5 shows a cross-sectional view illustrating a recession part in a fringe field switching array substrate according to another embodiment of the present invention. FIG. 6 shows a cross-sectional view illustrating a recession part in a fringe field switching array substrate according to another embodiment of the present invention. FIG. 7 shows a cross-sectional view illustrating a recession part in a fringe field switching array substrate according to another embodiment of the present invention. FIG. 8 shows a cross-sectional view illustrating a recession part in a fringe field switching array substrate according to another embodiment of the present invention. FIG. 9 shows a cross-sectional view illustrating a recession part in a fringe field switching array substrate according to another embodiment of the present invention. FIG. 10 shows a cross-sectional view illustrating a recession part in a substrate array substrate according to another embodiment of the present invention. FIG. 11 shows a cross-sectional view illustrating a recession part in a substrate array substrate according to another embodiment of the present invention. Please refer to FIG. 5, in one embodiment of the present invention, a step of forming a recession part in an array substrate 12 comprises: forming a first passivation layer 118 on the conductive cover layer 114, wherein the first passivation layer 118 covers the second conductive layer 116, and the first passivation layer 118 forms a recession part, wherein the conductive cover layer 114 is exposed in the recession part.

Please refer to FIG. 6, in one embodiment of the present invention, a step of forming a recession part in an array substrate 14 comprises: forming a conductive cover layer 114 on the first substrate 110, wherein the conductive cover layer 114 covers the first conductive layer 112 and forms a recession part; and forming a first passivation layer 118 on the conductive cover layer 114, wherein the first passivation layer 118 covers the second conductive layer 116 and the first passivation layer 118 forms a fringe of the recession part. Then the conductive cover layer 114 and the recession part are exposed.

Please refer to FIG. 7, in one embodiment of the present invention, a step of forming a recession part in an array substrate 15 comprises: forming a conductive cover layer 114 on the first substrate 110, wherein the conductive cover layer 114 covers the first conductive layer 112 and forms a recession part.

Please refer to FIG. 8, in one embodiment of the present invention, a step of forming a recession part in an array substrate 16 comprises: forming a first passivation layer 118 on the conductive cover layer 114, wherein the first passivation layer 118 covers the second conductive layer 116, and the first passivation layer 118 forms the recession part, wherein the recession part; and forming a conductive cover layer 114 on the first substrate 110, wherein the conductive cover layer 114 covers the first conductive layer 112, wherein The conductive cover layer 114 is exposed in the recession part.

Please refer to FIG. 9, in one embodiment of the present invention, a step of forming a recession part in an array substrate 17 comprises: forming a first passivation layer 118 on the conductive cover layer 114, wherein the first passivation layer 118 covers the second conductive layer 116, and the first passivation layer 118 forms a recession part; and forming a conductive cover layer 114 on the first substrate 110, wherein the conductive cover layer 114 covers the first conductive layer 112.

Please refer to FIG. 10, in one embodiment of the present invention, a step of forming a recession part in an array substrate 18 comprises: forming a second passivation layer 122 on the common electrode 120, wherein a part of the second passivation layer 122 forms a recession part; forming a first passivation layer 118 on the conductive cover layer 114, wherein the first passivation layer 118 covers the second conductive layer 116; and forming a conductive cover layer 114 on the first substrate 110, wherein the conductive cover layer 114 covers the first conductive layer 112.

Please refer to FIG. 11, in one embodiment of the present invention, a step of forming a recession part in an array substrate 19 comprises: forming a conductive cover layer 114 on the first substrate 110, wherein the conductive cover layer 114 covers the first conductive layer 112 and forms a fringe shape; forming a first passivation layer 118 on the conductive cover layer 114, wherein the first passivation layer 118 covers the second conductive layer 116 and forms the fringe shape; wherein the fringe shape is for example but not limited to a recession or an arc shape in a cross-sectional view.

By the foregoing array substrate design, the present invention can improve liquid crystal efficiency and increase a transmittance of a pixel, so that an image quality is improved.

"In some embodiments of the present invention" and "In a variety of embodiments of the present invention" are used repeatedly through the description. They usually mean different embodiments. However, they can also mean the same embodiments. "Comprising", "having" and "including" are synonyms, except it is noted to be different or has other meaning before and after its description.

The present invention has been described in considerable detail with reference to certain preferred embodiments thereof. It should be understood that the description is for illustrative purpose, not for limiting the scope of the present invention. Those skilled in this art can readily conceive simple or equivalent variations and modifications, which are still within the spirit of the present invention.

What is claimed is:

1. An array substrate, comprising:
    a first substrate;
    a first conductive layer formed on the first substrate;
    a conductive cover layer formed on the first substrate and covering the first conductive layer;
    a second conductive layer formed on the conductive cover layer;
    a first passivation layer formed on the conductive cover layer and covering the second conductive layer, at least one recession part is formed in the first passivation layer and the conductive cover layer;
    a common electrode formed on the first passivation layer, wherein a part of the common electrode is formed inside the recession part, wherein the part of the common electrode directly contact with a top surface of the first substrate, directly contact with side surfaces of the conductive cover layer and the first passivation layer;
    a second passivation layer formed on the common electrode; and
    a pixel electrode layer formed on the second passivation layer and inside the recession part.

2. The array substrate according to claim 1, wherein the common electrode is an indium tin oxide.

3. The array substrate according to claim 1, wherein the pixel electrode layer is an indium tin oxide.

4. The array substrate according to claim 1, wherein the first passivation layer includes a photomask.

5. The array substrate according to claim 1, wherein the second passivation layer includes a photomask.

6. The array substrate according to claim 1, wherein the array substrate has a recession shape in a cross-sectional view.

7. The array substrate according to claim 1, wherein the array substrate has an arc shape in a cross-sectional view.

8. A method of manufacturing an array substrate, comprising:
    providing a first substrate;
    forming a first conductive layer on the first substrate;
    forming a conductive cover layer on the first substrate and covering the first conductive layer;
    forming a second conductive layer on the conductive cover layer;
    forming a first passivation layer on the conductive cover layer and covering the second conductive layer, at least one recession part is formed in the first passivation layer and the conductive cover layer;
    forming a common electrode on the first passivation layer, wherein a part of the common electrode is formed inside the recession part, wherein the part of the common electrode directly contact with a top surface of the first substrate, directly contact with side surfaces of the conductive cover layer and the first passivation layer;
    forming a second passivation layer on the common electrode; and
    forming a pixel electrode layer on the second passivation layer and inside the recession part.

9. The method of manufacturing the array substrate according to claim 8, wherein the first passivation layer and the second passivation layer have a stepped surface in cross-sectional view.

10. The method of manufacturing the array substrate according to claim 8, wherein the first passivation layer and the second passivation layer are simultaneously formed by performing a photoresist coating process, an exposure process, a development process, and a mask process.

11. The method of manufacturing the array substrate according to claim 10, wherein the mask is a gray scale mask.

12. The method of manufacturing the array substrate according to claim 10, wherein the mask is a half tone mask.

13. The method of manufacturing the array substrate according to claim 8, wherein the second conductive layer is formed on the conductive cover layer by performing a photoresist coating process, an exposure process, a development process, a mask process and an etching process.

14. The method of manufacturing the array substrate according to claim 8, wherein the first passivation layer and the conductive cover layer are removed by an etching process, wherein a tapered angle or an inclined angle on a fringe area thereof is smaller than 90 degrees.

15. A display panel, comprising:
an array substrate, comprising:
a first substrate;
a first conductive layer formed on the first substrate;
a conductive cover layer formed on the first substrate and covering the first conductive layer;
a second conductive layer formed on the conductive cover layer;
a first passivation layer formed on the conductive cover layer and covering the second conductive layer, at least one recession part is formed in the first passivation layer and the conductive cover layer;
a common electrode formed on the passivation layer, wherein a part of the common electrode is formed inside the recession part,
wherein the part of the common electrode directly contact with a top surface of the first substrate, directly contact with side surfaces of the conductive cover layer and the first passivation layer;
a second passivation layer formed on the common electrode; and
a pixel electrode layer formed on the second passivation layer and inside the recession part.

16. The display panel according to claim 15, wherein the common electrode is an indium tin oxide.

17. The display panel according to claim 15, wherein the pixel electrode layer is an indium tin oxide.

18. The display panel according to claim 15, wherein the first passivation layer includes a photomask.

19. The display panel according to claim 15, wherein the second passivation layer includes a photomask.

20. The display panel according to claim 15, wherein the array substrate has an arc shape or a recession shape in a cross-sectional view.

* * * * *